Oct. 8, 1968   B. M. KAMERAS   3,404,556
ABRASION RESISTANCE TESTING APPARATUS
Filed June 18, 1965   3 Sheets-Sheet 1

INVENTOR
BORIS M. KAMERAS
BY Sol B. Wiof
ATTORNEY

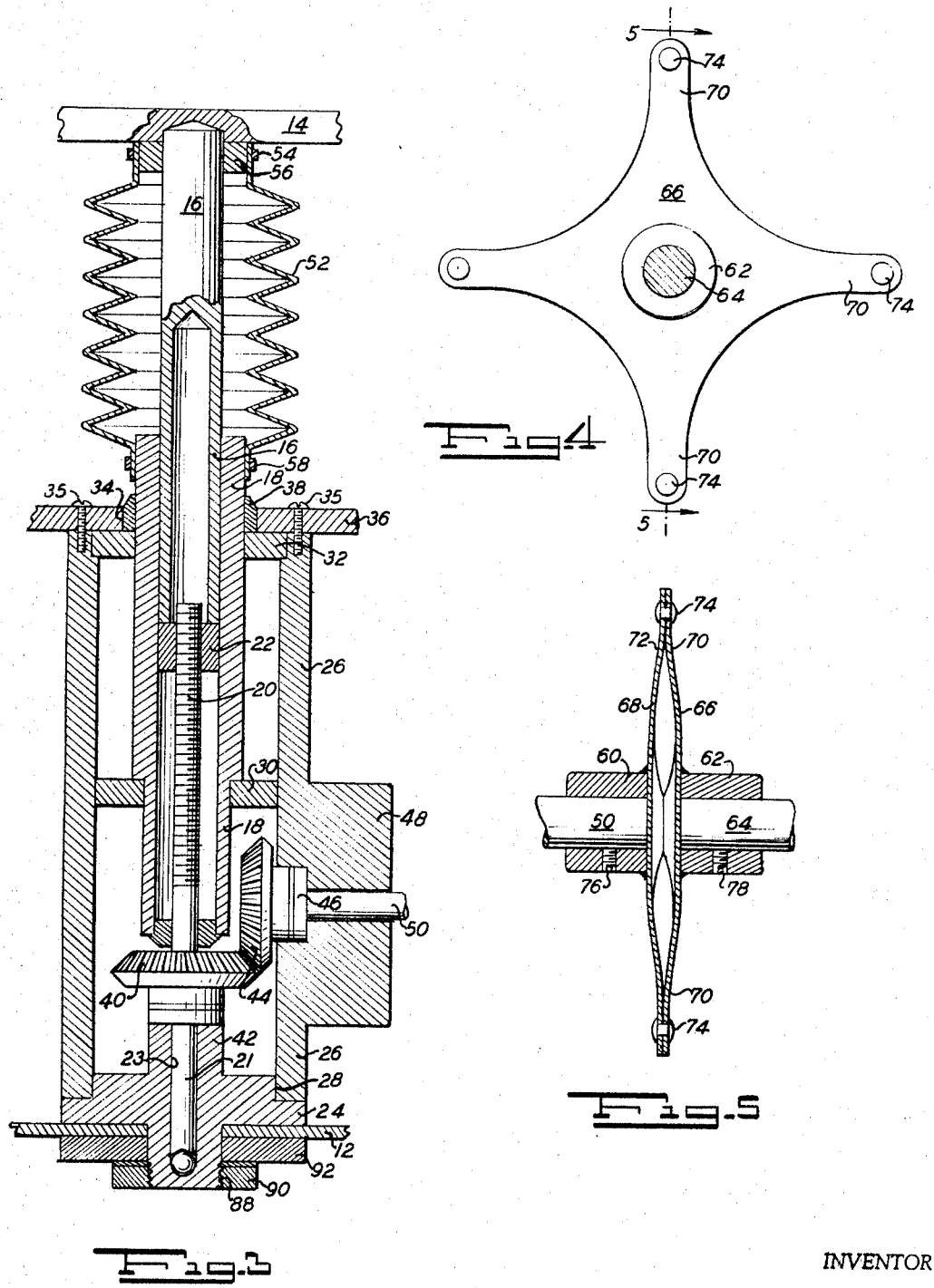

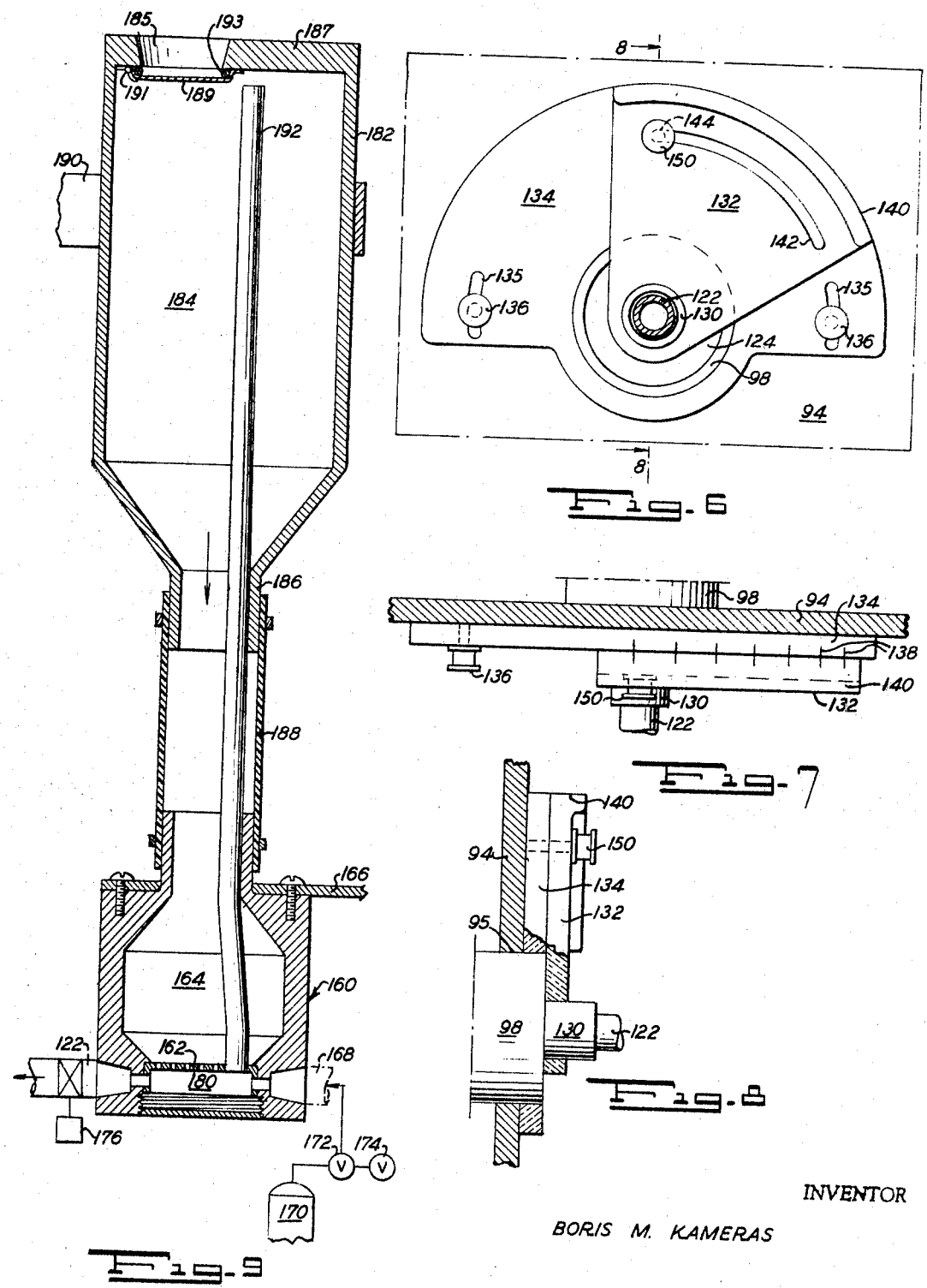

United States Patent Office 3,404,556
Patented Oct. 8, 1968

3,404,556
ABRASION RESISTANCE TESTING APPARATUS
Boris M. Kameras, 10715 Clermont Ave.,
Garrett Park, Md. 20766
Filed June 18, 1965, Ser. No. 464,942
11 Claims. (Cl. 73—7)

ABSTRACT OF THE DISCLOSURE

An abrasion testing device is provided for accurately measuring the resistance of a surface to abrasive wear, the device having means for mounting and controlling the position of the test sample in an isolated test chamber by externally abrasive protected control elements.

---

My invention relates to apparatus for testing the wear and abrasion resistance of surfaces comprising various materials to be tested, particularly the wear and abrasion resistance of coatings upon such surfaces. The material or coating is tested in the apparatus of this invention by directing a gas-propelled stream of abrasive particles in controlled abrasive force against the surface for accurate measurement of the resistance of the surface thereto.

While it is old to measure the abrasion resistance of surfaces such as coated or painted surfaces, as shown in U.S. Patent to Roberts et al., No. 2,907,200, the present invention has several improved and novel features.

One object of this invention is to provide an improved support means for a sample of the surface to be tested so that the test sample surface can be accurately positioned with micro precision, with respect to a nozzle from which a test abrasive stream is emitted.

A further object is an improved mounting of a nozzle in conjunction with a lighting system for conducting a stream of gas-propelled abrasive with respect to the test sample, so that the operator may visibly and accurately set the position of zero clearance between the nozzle and test sample.

A further object of the invention is to provide a means for setting the angle of the nozzle reproducibly with respect to a calibrated angular measuring device.

A further object is in the means for producing an abrasive feed to suspend a constant quantity of abrasive in a jet stream so that the feed may be of constant abrasive quality.

A further object is in the combination of the several means in a console with the several control means separated from the abrasive test chamber, with easy access to the test chamber and easy removal of spent abrasive particles in a manner to protect the functional elements.

The invention is further described in relation to the drawings in which:

FIG. 3 is an enlarged detailed view through the test model adjusting mechanism including gear drive;

FIG. 4 is a side view of means for adjusting the drive shafting to eliminate backlash and misalignment;

FIG. 5 is an elevation in section taken on the lines 5—5 in FIG. 4;

FIG. 6 is a front elevation of a means for adjusting the angle of the nozzle;

FIG. 7 is a top plan view of the angle-adjusting means of FIG. 6;

FIG. 8 is a side elevation of the angle-adjusting means of FIGS. 6 and 7; and

FIG. 9 illustrates an elevation section showing the feed and storage means for abrasive.

Figure 1:
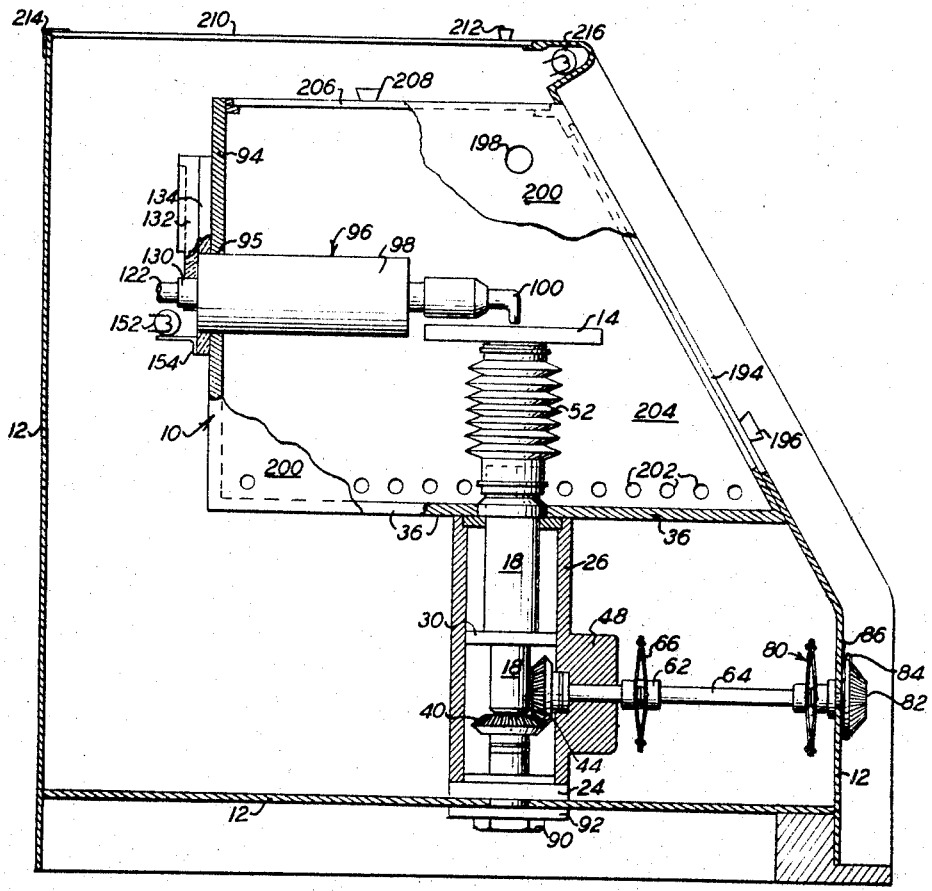
FIG. 1 is a section in side elevation through the cabinet and some of the operating elements.

Referring first to FIG. 1, the device comprises an enclosed test chamber 10 mounted within an outer housing 12. The housing 12 has several control elements for tests as will appear. The test elements comprise a table 14 on which is mounted a test sample, such as a painted plate of which the wear and abrasion resistance of the coating is to be tested by directing thereagainst a controlled feed of abrasive suspended in a gaseous stream or jet. The test sample may be secured to the table surface with clamps, clips or the like, but these are not generally needed.

The table 14 is supported on a shaft 16 (FIG. 3) slidably mounted within a sleeve 18 for vertical reciprocation upon a threaded stud 20 mating with a threaded ring 22 on the lower end of the reciprocating shaft 16. In this construction, as the stud 20 is rotated in the threaded ring 22, the table supporting shaft 16 reciprocates slidingly within the sleeve 18. The lower end 21 of the stud 20 is received in the bore 23 of a supporting base 24. The base 24 further supports an outer cylinder 26 press fitted thereon at its edge 28. An intermediate ring 30, within the cylinder 26, supports the sleeve 18. The upper end of the cylinder 26 may have a ring closure 32 and is fastened by studs 35 about a bore 34 in the bottom wall 36 of the test chamber. A rubber sealing ring 38 seals the bore 34 against the sleeve 18 to prevent passage of dust, particularly abrasive powder, into the adjusting gearing.

A lower bevel gear 40 is fastened about the shaft end 21 for rotary support on a boss 42 raised from the center of support 24. A mating bevel gear 44 is mounted horizontally to mesh with gear 40 and is supported in a sleeve bearing 46 in a side boss 48 extending horizontally from the cylinder 26. A horizontal shaft 50 is keyed to the gear 44 for rotation thereof. Thus, by rotation of shaft 50 and gear 44, gear 40 meshed therewith will drive stud 20 and effect vertical reciprocation of the shaft 16 and table 14 thereon.

An abrasive resistant bellows 52, formed of leather, plastic sheeting or the like, has its upper end fastened to ring 54 by a spring, pressing the bellows against press fitted ring 56 on the upper end of shaft 16. The lower end of the bellows 52 is fastened by spring ring 58 against the upper end of sleeve 18. The bellows 52 thereby serves to protect the sliding shaft 16, reciprocating within sleeve 18, against wear by dust, particularly abrasive dust, which might deposit upon the reciprocating elements.

The horizontal shaft 50 has its outer end secured within a sleeve 60 (FIG. 5). Another horizontal shaft 64 aligned with shaft 50 is fitted into a contiguous hub member 62. Both hub members 62 and 60 support resilient disc bodies 66 and 68 respectively which terminate in mating spoke elements 70 and 72 fastened together by rivets 74 so that disc 66 and disc 68 are secured at their outer edges in a composite drive of resilient discs, forming with each hub member 60 and 62 a continuous disc drive radially fixed but axially resilient, thus resisting any rotary play. In assembling, the shaft 50 is mounted in sleeve 60 with the inner end bearing positively against the disc face 68 and set by set screw 76. Similarly the shaft 64 is inserted in sleeve 62 and fixed by a set screw 78 so that the inner end bears positively against disc 66. The assembly thereby forms a continuous drive through the shafts 64 and 50 and gears 44 and 40 designed to mesh with each other and vertical stud 20 without any play or backlash.

In a like manner, the opposite end of shaft 64 can be assembled with a second disc-like drive 80 (FIG. 1) easily adjusted axially and similarly providing a firm rotary drive without any rotary play. The outer end of shaft 64 terminates in a dial 82 which may have an indicator 84 at its periphery cooperating with lines of calibrations 86 on the face of the front of the outer housing wall 12. The calibrations 86 are suitably selected and spaced with respect to the size of the gears, so that one calibration will result in a selected vertical movement of table 14 through the bearing chain described to cause vertical reciprocation thereof through a fixed vertical dimension, for example, $\frac{1}{1000}$ of an inch or some multiple thereof, to provide a fixed linear dimension movement of the table 14 with a calibrated turn of the dial 82.

Other means for dial calibration than that described above may be used. For example, a multiple-turn potentiometer dial with more than one scale, or a dial of the direct read-out type, capable of calibration, may be substituted as known in the art of dial construction and calibration.

The adjustment of the shafting 50 and 64 within the disc drive is set to support gears 44 and 40 in close driving mesh to remove all rotary as well as axial play for exact transmission of a fixed vertical dimensional movement of table 14 with the rotation of the dial 82 through a selected calibration. The lower end of the support base 24 as shown in FIG. 3 may have a threaded portion 88 which extends through the lower housing wall 12 and may be fastened thereto by a nut 90, preferably through an intermediate spacing washer 92 to secure the test table assembly both to the test chamber floor 36 and housing 12 for fixed position operation to allow controlled vertical reciprocation of the table 14 within the test chamber with great precision by rotation of dial 82.

Figure 2:
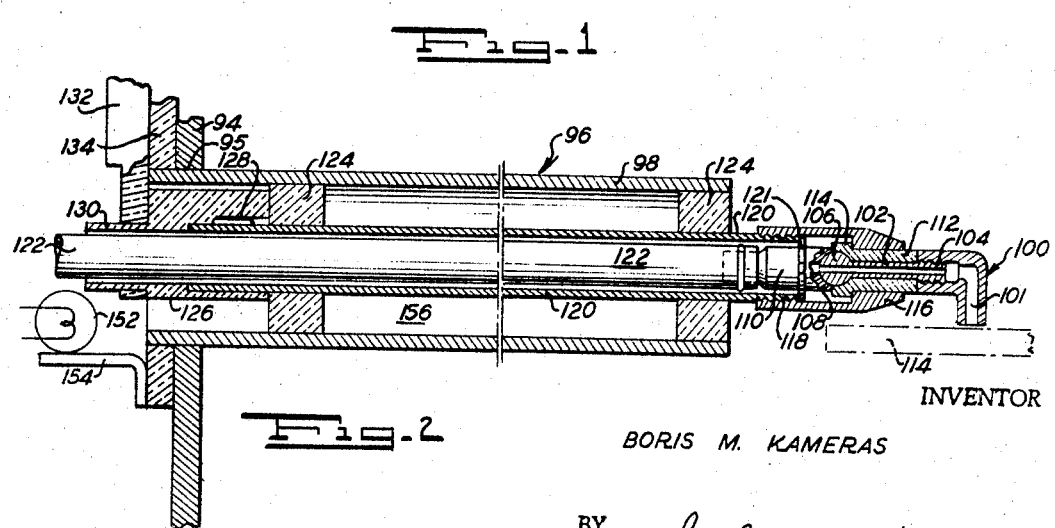
FIG. 2 is a longitudinal section through the nozzle assembly.

As shown in FIGS. 1 and 2, a nozzle assembly 96 comprising a cylindrical housing 98 is mounted inward from a bore 95 in a rear wall 94 of the test chamber 10. The nozzle tip 100 is mounted over a swiveling core element 102 to which it is threaded at one end 104, the inner core element 106 comprising a ball bearing against a mating socket end 108 of a connector tube 110. The core 102 has slidingly fitted thereabout a sleeve 112 whose inner end 114 receives and presses the ball 106 into the socket 108. The end 114 has a shoulder which is engaged by an outer nozzle sleeve 116 whose inner end 118 is matingly threaded upon a nozzle housing tube 120. A spacing washer 121 is fitted over the connector tube 110 centering the connector tube 110 within the sleeve 116, and engaging a rounded end portion of the socket 108 so that tightening of the nozzle sleeve 116 secures the ball and socket joint under adjusted tension centered in supporting tube 120, so that the nozzle 100 is supported therein adjustably and securely to the tube 120. The connector tube 110 has its inner end resiliently socketed with a flexible connector tube 122 through which a suspended abrasive is carried from a source, as will appear. The connector tube 110 and core element 102 are both concentrically bored to provide a continuous duct with the hollow downturned nozzle portion 101 at the end of the nizzle 100, as shown. According to the construction described, the ball jointed nozzle supports the same in any adjusted resistance to movement so that the nozzle can be pre-set to angle with respect to the plate 114. The entire nozzle assembly as further described below can be rotated to an accurately measured angle, hence in simple less flexible constructions the ball jointed nozzle mounting can be eliminated, if desired.

The tube 120 is rotatably mounted in transparent spacing rings 124 coaxially within the housing cylinder 98. The inner end of the tube 120 has fitted thereabout a Lucite or metallic bracket 126, keyed thereto at 128 for rotation therewith. The bracket 126 in turn has a narrow outwardly extending sleeve 130. A Lucite crank member 132 (FIG. 6) is press fitted upon sleeve 130 so that as the Lucite crank element 132 is rotated with sleeve 130 and tube 120 as a pivot, the entire tube 120 and nozzle 100 thereon rotate as a unit within transparent rings 124 as bearing support therefor.

The Lucite crank member 132 is triangular in shape, like a sector of a circle pivoting about sleeve 130 and having an arcuate edge 140. The crank sector 132 bears parallel in rotation against a measuring plate 134 which is fastened by studs 136 to the rear wall 94 of the test chamber. The measuring plate 134 has calibrations 138 extending arcuately above the arcuate rim 140 of the crank member 132, as shown in FIG. 7. The rim 140 is calibrated on the arcuate edge 140 cooperative with the calibrations 138 for adjusting the angular position of the crank member 132 with respect thereto. The crank member 132 is slotted arcuately through an arc 142 parallel to the arcuate edge 140. The slotted arc 142 extends through the body of the crank member 132 and is wide enough to slidingly receive, for unimpeded angular rotation, a threaded shank portion 144 of a stud having a knurled thumb screw 150 fastened thereon and bearing against the surface of the crank plate 132 for securing the same in any fixed and selected angular position with respect to the measuring plate 134 as a detent. Thus, by suitably mounting the crank arm 132 upon the cylindrical shank 130, the entire support tube 122 and nozzle thereon may be rotated to a selected angle by positioning of calibrated positions 140 and 138 and fixed by the detent; that is, fastening a thumb screw 150 in the selected arcuate position. Thus, the nozzle 100 and downturned tip 101 may be rotated to the desired angle with respect to the work table 14 and thus direct the jet of abrasive on a test sample at said selected angle. For calibration and increased versatility, the angle measuring plate 134 may be further slotted at 135, and fastening stud elements such as thumb screws 136 as described above for 150 may be used, so that the measuring plate itself may be arcuately moved in either direction, either for accurate positioning of the indicia 138 thereon or for movement to angular position more or less extended, thus providing more flexibility in the measuring plate 134, as well as the crank member 132 cooperating therewith.

As indicated, the work table is accurately moved vertically in exactly measured calibrated units. It is desirable, however, in measuring the distance of the work table and test sample from the nozzle, to accurately pre-set both to a zero position. For this purpose, the position of the test surface may be sighted by the test operator visibly with respect to the nozzle tip, and any clearance therebetween may be observed. In order to visibly see or examine that amount of clearance, a small light bulb 152 (FIG. 2), connected to a current supply (not shown), is mounted from a bracket element 154 to project light through the space 156 between the nozzle support tube 120 and the tubular housing 98. The light will not be intercepted or extinguished in substantial luminosity because it will pass through the spacing rings 124 since these for light transmissive purposes are formed of a light transmissive substance such as Lucite, glass, or the like. Consequently, the light rays will pass through the spacing rings 124 and illuminate the nozzle tip 101, so that any clearance between said tip and the top of the test table 14 or workpiece thereon will be seen. For similar reasons, to avoid light interception at any given position of the nozzle, the crank member 132 and measuring plate 134 are also preferably formed of light transmissive materials such as Lucite.

The duct 122, which may be abrasive resistant, formed of rubber, metal or armored construction, interconnects the nozzle 100 and a supply of abrasive as shown in FIG. 9. In order to have available a substantial and relatively constant supply of abrasive powder, two supply hoppers are provided. A lower hopper 160 has a lower perforated plate 162 which is mounted below a chamber 164 therein, so that the powder, by vibration, sifts continuously through the perforated tube into chamber 180. The entire hopper 160 is supported upon the vibrating arm 166 of a standard electrical vibrator mechanism, which is not shown but is of standard construction, to impart continuous vibration to the chamber 160. The supply of powder is picked up by a steady current of air entering through duct 168 from a supply of gas under pressure 170, controlled by valves 172 and 174, standard for release of gas from a bottled gas supply. The valve 172 may be preset manually and the actual gas flow may be controlled electrically by a solenoid valve 176 placed in the transfer duct 122 for remote control or adjustment thereof, as desired. Thus, the gas in controlled supply passes through inlet 168 and thence into chamber 180 beneath the vibrating grid 162 and picks up a controlled amount of powder continuously sprinkled therein as a suspension and passes thence into duct 122 to the test nozzle.

The chamber 164 is preferably comparatively small, but is kept full to maintain a constant weight and center of gravity so as to preserve the constant amplitude of vibration essential for uniform abrasive flow. In order to maintain the quantity of powder in chamber 164 constant, a master supply source comprising a hopper 182 mounted above the chamber 164 is provided, which may also be filled with powder through an opening 185 in the top 187 upon which a manually depressible lid 189 is fitted and retained by a spring-loaded hinge 191 pressing the lid in tight closure position against an O ring gasket 193, or to any desired level and filled intermittently, that is, from time to time as the need appears. The large supply of powder from chamber 184 passes downward through the opening or neck 186 of the hopper 182, and thence into the small supply hopper 160 connected thereto by way of a flexible tube 188. While, as shown in FIG. 9, hopper 182 is placed directly above hopper 160, it is not necessary that these be mounted vertically aligned. In some cases it would be preferred to mount hopper 182 displaced from vertical alignment for the benefit of spacial arrangement within the cabinet, and sometimes for the benefit of reducing hydrostatic pressure upon the chamber 164. Such displacement is made possible by the interconnecting flexible tube 188 which may be longer than shown to allow displacement to a gooseneck or other arrangement. The large hopper 182 may be supported by a bracket 190 in any suitable manner. A pressure equalizing pipe 192 passes through the grid 162 and terminates in the chamber 180 so that an even supply of solids without bubbles, gas, or channels is maintained in the chamber 164. By this construction an evenly flowing constant quantity of abrasive powder is available from hopper 160 notwithstanding that hopper 160 is further supplied from the large source of hopper 182 which may have a widely variable quantity of abrasive. This serves to maintain a constant and even supply of abrasive to the gas stream passing to the nozzle tip 101, even though the large hopper 182 may be filled intermittently from time to time as it may appear to be necessary.

The supply device shown in FIG. 9 is mounted outside of the test chamber 10 (FIG. 1) and principally within the cabinet 12 except for large gas supply, which may be a bottle of gas connected by a tube 168 placed more remotely as a gas supply to the apparatus and replaced with a fresh supply bottle from time to time as needed. The other operating instruments, however, may be disposed within the chamber 12 as described and moved portably therewith and controlled externally by dials mounted usually on the front wall of the housing.

The test chamber 10 contains only the movable table 14 and nozzle 100; their position and the complete testing operation may be fully viewed through a light transmissive front closure plate 194. The plate 194 may be fitted against depressed supporting channels or strips as a rectangular plate which may be lifted out and replaced, grasping a knob or handle member 196 for handling of the plate 194. By this construtcion all of the operating elements are disposed outside of the test chamber except the table and the nozzle. Thus all operating and control elements are specially protected from extraneous wear by seepage of abrasive powders into their operating joints. Also the table reciprocating means itself is protected by the bellows 52 and the nozzle is enclosed in tube 96 as described.

The test chamber 10 is maintained essentially free of spent dust by inserting the suction end of a vacuum cleaning tube into an aperture 198 in an end wall 200 of the test chamber, thereby applying gaseous suction thereto by the suction of an ordinary vacuum cleaner. In order to complement that suction and help sweep the spent abrasive dust from the chamber, a series of inlet holes 202 are bored in an opposite side wall 204 of the test chamber through which a stream of scavenging air can enter. Thus, for cleaning of the chamber the suction tube of a vacuum cleaner applied through a duct 198 allows a stream of gas to enter through holes 200 near the bottom wall 36 of the test chamber, entrain the spent abrasive dust therein, and be emitted under suction through duct 198.

The device further provides two access openings for mounting and removal of test samples upon the test table 14 by removal of the transparent enclosure 194, which is fitted in its supporting brackets lying angularly as shown, and which will be dust-tight to prevent abrasive emission during use of the apparatus. For further manipulation, a second opening is closed by a covering element 206 which covers the top of the test chamber 10, and is lifted by a knob 208 for vertical access.

The outer housing itself may have a hinged cover 210 which may be raised by grasping a knob 212, so that the cover can be swung vertically open upon hinges 214 in the back wall 12 of the assembly. A light element 216 can be mounted across the top of the chamber; preferably an elongated fluorescent tube light is mounted across the top of the cabinet for even lighting of the interior for further observation of the test.

As thus described, an abrasive jet tester for testing the wear resistance of surfaces, particularly coated surfaces, is provided, including an accurately positioned remote controlled test table, a nozzle whose angle is easily set and maintained, and a zeroing light for setting the nozzle and the sample at zero position. Close control is provided for even distribution and constant supply of abrasive powder to the gas stream. A test chamber is provided easily accessible through a transparent window to observe the results of the test.

The unit is provided with a timing means as known in the art for measuring the duration of the test. Several elements as described provide greatly increased accuracy and convenience for testing the abrasion resistance of surfaces. More tests can be applied by the device with far greater precision and convenience.

Certain modifications may occur to those skilled in the art and, accordingly, it is intended that the description be regarded as illustrative and not limiting except as provided in the claims appended hereto.

I claim:

1. In an apparatus for measuring wear and abrasion resistance to test strength to applied abrasive particles, a housing having test control means therein, partitioning elements disposed in said housing enclosing a test chamber, said partitioning elements supporting and separating portions of said test control means with operating elements thereof extending through said partitioning elements from said housing into said test chamber for performing tests therein, exhaust means extending into said test chamber for withdrawing gases therefrom, partitioning elements opposite to said exhaust means in said test chamber having at least one opening near the bottom allowing ingress of air and providing thereby a purging stream of gas flowing from said opening across the bottom of said test chamber entraining deposited abrasive particles for withdrawal as a stream through said exhaust means, and a removable transparent closure exposing the test elements in said test chamber to external observation while applying external manual control of tests conducted in said test chamber, said closure further providing external access to said test chamber to mount samples for performing surface wear and abrasion tests thereon.

2. The device as defined in claim 1 wherein control elements extending into said test chamber are protectively encased to resist ingress of abrasive particles.

3. Device as defined in claim 1 wherein the test control means extending into said test chamber includes a nozzle conected to a supply of abrasive particles and a carrier gas, said nozzle being supported in said test chamber while emitting a gaseous jet of abrasive particles, a table for supporting the test sample below said nozzle, and means outside of the apparatus for accurately and measurably positioning said table and test sample with respect to said nozzle.

4. The device as defined in claim 3 wherein said nozzle has a downturned tip from which the jet of gas having abrasive particles suspended therein is emitted, said nozzle being horizontally supported in said test chamber within a sighting tube extending through a partitioning element, said sighting tube having at least one transparent closure, and illuminating means mounted in said housing positioned behind said sighting tube and providing a beam of light illuminating said nozzle tip through said transparent closure, whereby the position of said nozzle tip with respect to said test sample and table is illuminated for observation of zero clearance.

5. In apparatus for measuring wear and abrasion resistance, a housing, a horizontal test table for support of a test sample thereon, a nozzle supported above said table, said nozzle being connected to a source of abrasive and carrier gas therefor for emission as an abrasive jet from said nozzle, said table being mounted upon a reciprocating support for vertical reciprocation, a dial control mounted outside of said housing calibrated with indicia measuring the vertical positioning of said table with respect to said nozzle in micronic distances per digital reading, said dial and table being interconnected by shafting and adjustable non-backlash gearing to raise and lower said table by movement of said dial control.

6. The device as defined in claim 5 wherein the reciprocating support beneath said table is encased in a resilient vertical expandable boot protective of the raising and lowering means for said table from damage by abrasive dust.

7. In apparatus for measuring wear and abrasion resistance, a housing, a test chamber within said housing, a horizontal test table for support of a test sample thereon in said test chamber, means external of said housing for adjusting the vertical position of the test table, a horizontal nozzle extending into said test chamber and having a downturned tip directing a jet of suspended abrasive in a carrier fluid upon said table and test sample thereon, a light mounted behind said nozzle illuminating said tip and test table whereby the zero position of said table is visibly adjustable externally of said housing with respect to the said nozzle tip.

8. Apparatus for measuring wear and abrasion resistance, comprising a housing, a test chamber in said housing, a test sample supporting table mounted for vertical reciprocation in said test chamber, means outside of said housing for adjusting the vertical position of said table, a horizontally mounted nozzle in said test chamber having a downturned tip for projecting an abrasive jet upon a test sample mounted on said table, said nozzle being mounted for rotation of its tip to direct an abrasive stream at a selected angle upon the test sample, and means in said housing outside of said test chamber for pre-setting the angle of said nozzle.

9. Device as defined in claim 8 wherein the nozzle is mounted for rotation in a tubular member supported from the wall of said test chamber, said tubular member having a radius larger than the length of said downturned nozzle tip, a light conductive panel member fitted within said tubular member, a source of illumination behind said tubular member whereby to illuminate said nozzle tip for visibly adjusting the distance separating said nozzle tip and table and test sample thereon.

10. Apparatus for measuring wear and abrasion resistance comprising a housing, a test chamber in said housing, a horizontally supported nozzle connected to a tube at its inner end and said tube extending through a wall of said test chamber and into said housing, a crank member secured to said inner nozzle end adapted to rotate said nozzle in angular movement thereof, said crank member being planar body shaped as a sector of a circle secured to said nozzle at the center and having a groove arcuately cut therein parallel to its arcuate periphery, and a detent extending through said groove having a fastener thereon adapted to secure said sector crank element in a preselected fixed angular position of said nozzle with respect to indicia disposed near the arcuate periphery of said crank member, said indicia calibrated for measuring the angular position of said crank and nozzle.

11. The device as defined in claim 4 including a source of carrier gas for said feed of abrasive, a pair of supply hoppers mounted in a vertical tier, one above the other, and interconnected by resilient duct means, means for vibrating said lower supply hopper and chamber below said lower supply hopper into which abrasive particles are sprinkled by vibration of said hopper, said source of gas having duct means leading to said chamber into which abrasive is vibrationally sprinkled and from said chamber to said nozzle for conveying a constant supply of abrasive suspended in said gas to said nozzle.

References Cited

UNITED STATES PATENTS

| | | | |
|---|---|---|---|
| 2,299,405 | 10/1942 | Prange | 51—8 |
| 2,584,647 | 2/1952 | Webber | 51—8 |
| 2,799,155 | 7/1957 | Newton et al. | 73—7 |
| 2,907,200 | 10/1959 | Roberts et al. | 73—7 |
| 3,065,627 | 11/1962 | Ross | 73—7 |
| 3,229,498 | 1/1966 | Oakes | 73—7 |
| 3,307,296 | 3/1967 | Ashworth | 51—8 |

DAVID SCHONBERG, *Primary Examiner.*

JEFFREY NOLTON, *Assistant Examiner.*